United States Patent
Matsushita et al.

(10) Patent No.: US 10,670,138 B2
(45) Date of Patent: Jun. 2, 2020

(54) VEHICLE DRIVE DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Junji Matsushita, Anjo (JP); Naoya Usami, Anjo (JP); Takeshi Horie, Anjo (JP); Kuniaki Ishii, Toyota (JP); Kazuyuki Shiiba, Miyoshi (JP); Tooru Matsubara, Toyota (JP); Atsushi Kawamoto, Toyota (JP); Kiyonori Takagi, Okazaki (JP); Hidehiko Bansyoya, Toyota (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 920 days.

(21) Appl. No.: 15/129,180

(22) PCT Filed: Apr. 22, 2015

(86) PCT No.: PCT/JP2015/062213
§ 371 (c)(1),
(2) Date: Sep. 26, 2016

(87) PCT Pub. No.: WO2015/163357
PCT Pub. Date: Oct. 29, 2015

(65) Prior Publication Data
US 2017/0114886 A1 Apr. 27, 2017

(30) Foreign Application Priority Data
Apr. 25, 2014 (JP) ................ 2014-091342

(51) Int. Cl.
F16H 57/04 (2010.01)
F16H 57/027 (2012.01)
(Continued)

(52) U.S. Cl.
CPC ......... F16H 57/0476 (2013.01); B60K 6/405 (2013.01); F16H 57/027 (2013.01);
(Continued)

(58) Field of Classification Search
CPC .. F16H 57/0476; F16H 57/04; F16H 57/0443; F16H 57/0446; B60K 6/405; B60K 6/44
(Continued)

(56) References Cited

U.S. PATENT DOCUMENTS 5,176,039 A 1/1993 Takeuchi et al.
7,350,603 B2 4/2008 Takami et al.
(Continued)

FOREIGN PATENT DOCUMENTS

DE 102014204088 A1 9/2015
JP H04-219561 A 8/1992
(Continued)

Primary Examiner — William C Joyce
(74) Attorney, Agent, or Firm — Oliff PLC

(57) ABSTRACT

A vehicle drive device that includes a case forming a first accommodating space that accommodates a speed change device and a second accommodating space that accommodates a rotary electric machine; an storage that is disposed under the first accommodating space and stores oil; a hydraulic pump including a suction that suctions the oil from the oil storage; a first oil passage that supplies the oil discharged by the hydraulic pump to the speed change device as hydraulic oil; a second oil passage that supplies the oil discharged by the hydraulic pump to the rotary electric machine as cooling oil; and a third oil passage that returns the oil supplied to the rotary electric machine, from the second accommodating space to the oil storage, by allowing (Continued)

the oil to flow in a direction from the second accommodating space toward the first accommodating space.

10 Claims, 3 Drawing Sheets

(51) Int. Cl.
*B60K 6/405* (2007.10)
*F16H 61/00* (2006.01)
*B60K 6/44* (2007.10)
*F16H 57/02* (2012.01)

(52) U.S. Cl.
CPC ......... *F16H 57/04* (2013.01); *F16H 57/0443* (2013.01); *F16H 57/0446* (2013.01); *F16H 61/0021* (2013.01); *B60K 6/44* (2013.01); *B60Y 2200/92* (2013.01); *B60Y 2306/03* (2013.01); *B60Y 2306/05* (2013.01); *F16H 2057/02034* (2013.01); *F16H 2061/0037* (2013.01); *Y10S 903/902* (2013.01)

(58) Field of Classification Search
USPC .......................................................... 74/661
See application file for complete search history.

(56) References Cited

U.S. PATENT DOCUMENTS

| | | | |
|---|---|---|---|
| 8,851,861 B2* | 10/2014 | Frait | B60R 16/02 |
| | | | 180/65.21 |
| 9,447,864 B2* | 9/2016 | Iwase | B60K 6/405 |
| 2006/0179973 A1 | 8/2006 | Matsufuji et al. | |
| 2011/0120805 A1 | 5/2011 | Michel et al. | |
| 2013/0111891 A1 | 5/2013 | Iwase et al. | |
| 2014/0231174 A1 | 8/2014 | Iwase et al. | |

FOREIGN PATENT DOCUMENTS

| | | |
|---|---|---|
| JP | 2005-162002 A | 6/2005 |
| JP | 2005-248991 A | 9/2005 |
| JP | 2009-067140 A | 4/2009 |
| JP | 2009-108977 A | 5/2009 |
| JP | 2010-190425 A | 9/2010 |
| JP | 2013-095389 A | 5/2013 |

* cited by examiner

VEHICLE DRIVE DEVICE

BACKGROUND

The present disclosure relates to a vehicle drive device including an oil passage that supplies oil discharged by a hydraulic pump, which suctions oil from an oil storing portion, to a rotary electric machine as cooling oil, and an oil passage that returns the oil supplied to the rotary electric machine to the oil storing portion.

Japanese Patent Application Publication No. 2010-190425 discloses a configuration in which a clutch chamber [5] is disposed on the vehicle front side of a transmission chamber [4], and oil is returned from the clutch chamber [5] to the transmission chamber [4] through an oil passage opening [8] formed in an intermediate wall [6] disposed between the clutch chamber [5] and the transmission chamber [4], Further, in the configuration disclosed in Japanese Patent Application Publication No. 2010-190425, in order to reduce the amount of oil that flows back from the transmission chamber [4] to the clutch chamber [5] during sudden braking of the vehicle, a flap valve [9] that allows the flow of oil to the transmission chamber [4] and blocks or interferes with the flow of oil to the clutch chamber [5] is provided at the oil passage opening [8]. Japanese Patent Application Publication No. 04-219561 discloses a valve body [26a] that is similar to the flap valve [9] of Japanese Patent Application Publication No. 2010-190425 although the direction in which oil is allowed to flow is opposite to that of Japanese Patent Application Publication No. 2010-190425 in the vehicle front-rear direction.

In the configuration of Japanese Patent Application Publication No. 2010-190425, due to the positional relationship between a pivot axis [10] of the flap valve [9] and a stopper [12], not only during braking of the vehicle but also during normal travel (for example, when the vehicle is traveling straight at a constant speed), the flap valve [9] opens the oil passage opening [8] with a pressing force toward the vehicle rear side which is applied to the flap valve [9] by the oil flowing from the clutch chamber [5] to the transmission chamber [4], so that oil is returned to the transmission chamber [4]. That is, the flow of oil toward the transmission chamber [4] is interfered with by the amount of the pressing force that presses the flap valve [9]. For example, when the vehicle is traveling on a descending slope, a force in the direction of closing the oil passage opening [8] is applied to the flap valve [9] due to gravitational acceleration, so that the flap valve [9] is not easily opened, which makes this issue more prominent. However, this issue is not particularly recognized in Japanese Patent Application Publication No. 2010-190425.

Further, Japanese Patent Application Publication No. 2013-95389 discloses a vehicle drive device including a first oil passage that supplies oil discharged by a hydraulic pump, which suctions oil from an oil storing portion, to a speed change device as hydraulic oil, a second oil passage that supplies the oil discharged by the hydraulic pump to a rotary electric machine as a cooling oil, and a third oil passage that returns the oil supplied to the rotary electric machine to the oil storing portion. In the configuration of Japanese Patent Application Publication No. 2013-95389, a discharge oil passage [AD] that returns the oil supplied to the rotary electric machine [MG] to a first oil storing portion [U1] is provided as the third oil passage, and a flow restricting mechanism [100] for reducing the amount of oil that flows back through the discharge oil passage [AD] during sudden braking of the vehicle is provided. Referring to paragraph 0076 in Japanese Patent Application Publication No. 2013-95389 and FIG. 5, etc., the flow restricting mechanism [100] for reducing the amount of oil that flows back through the discharge oil passage [AD] is formed with a structure in which a second opening portion [AEo] on the upstream side of the discharge oil passage [AD] is located above a first opening portion [ADo] on the downstream side. In the configuration disclosed in Japanese Patent Application Publication No. 2013-95389, in order to enhance the effect of reducing back flow of oil, a valve [6] that switches from a closed state to an open state in accordance with a hydraulic pressure from the side opposite to the first oil storing portion [U1] is provided as the flow restricting mechanism [100] in the discharge oil passage [AD] as illustrated in FIG. 7 of Japanese Patent Application Publication No. 2013-95389. However, in this configuration, as in the configuration of Japanese Patent Application Publication No. 2010-190425, not only during braking of the vehicle but also during normal travel, the oil flow to the first oil storing portion [U1] through the third oil passage is interfered with.

SUMMARY

An exemplary aspect of the disclosure implements a vehicle drive device capable of appropriately allowing oil to flow through an oil passage that returns oil to an oil storing portion during normal travel of a vehicle except for during braking, and reducing the amount of oil that flows back through the oil passage during sudden braking of the vehicle.

According to an exemplary aspect, a vehicle drive device includes: a case forming a first accommodating space that accommodates a speed change device and a second accommodating space that accommodates a rotary electric machine; an oil storage that is disposed under the first accommodating space and stores oil; a hydraulic pump including a suction that suctions the oil from the oil storage; a first oil passage that supplies the oil discharged by the hydraulic pump to the speed change device as hydraulic oil; a second oil passage that supplies the oil discharged by the hydraulic pump to the rotary electric machine as cooling oil; and a third oil passage that returns the oil supplied to the rotary electric machine, from the second accommodating space to the oil storage, by allowing the oil to flow in a direction from the second accommodating space toward the first accommodating space; wherein a direction from the first accommodating space toward the second accommodating space is a target direction, and the target direction coincides with a direction toward a front of the vehicle in a state where the case is attached to the vehicle; the third oil passage includes an opening/closing mechanism that opens and closes the third oil passage, and an opening that is open toward the oil storage; the opening/closing mechanism includes an opening/closing member that is swingable about a swing axis extending in a horizontal direction orthogonal to the target direction, and that has a center of gravity below the swing axis; and the opening/closing member is configured to swing such that the center of gravity moves in the target direction to close the opening.

According to this configuration, the vehicle drive device is attached to the vehicle such that the target direction coincides with the direction toward the front of the vehicle. Further, the third oil passage including the opening that is open toward the oil storage further includes the opening/closing mechanism that opens and closes the opening. The opening/closing mechanism includes the opening/closing member. The opening/closing member swings such that the center of gravity of the opening/closing member moves in the target direction to close the opening.

For example, when the vehicle is traveling at a constant speed on a road with a gradient of zero, the acceleration in the target direction is not large enough to swing the center of gravity of the opening/closing member in the target direction. Accordingly, it is possible to appropriately return the oil supplied to the rotary electric machine from the second accommodating space to the oil storage through the third oil passage. Accordingly, it is possible to prevent a large amount of oil from being stored in the second accommodating space and to reduce energy loss due to agitation of the oil by the rotary electric machine accommodated in the second accommodating space. Further, the oil level in the oil storage can be maintained high enough to prevent suction of air by the hydraulic pump. The same applies to the case where the vehicle is traveling on a descending slope, for example. More specifically, the same applies to the case where the downward gradient is small enough not to make the acceleration in the target direction large enough to swing the center of gravity of the opening/closing member in the target direction.

On the other hand, during sudden braking of the vehicle or when the vehicle is traveling on a descending slope with a large gradient, the acceleration in the target direction increases. If the acceleration is large enough to move the center of gravity of the opening/closing member in the target direction and thereby close the opening, the third oil passage is closed, so that the amount of oil that flows back through the third oil passage can be reduced. Therefore, it is possible to prevent oil from flowing from the oil storage through the third oil passage and being discharged toward the second accommodating space. Accordingly, it is possible to prevent the oil level in the oil storage from being greatly reduced, and thus to maintain the oil level in the oil storage high enough to prevent suction of air by the hydraulic pump. Thus, with the configuration described above, it is possible to appropriately allow oil to flow through the oil passage (the third oil passage) that returns oil to the oil storage during normal travel of the vehicle except for during braking, and to reduce the amount of oil that flows back through the oil passage (the third oil passage) during sudden braking of the vehicle.

DETAILED DESCRIPTION OF EMBODIMENTS

Figure 1:
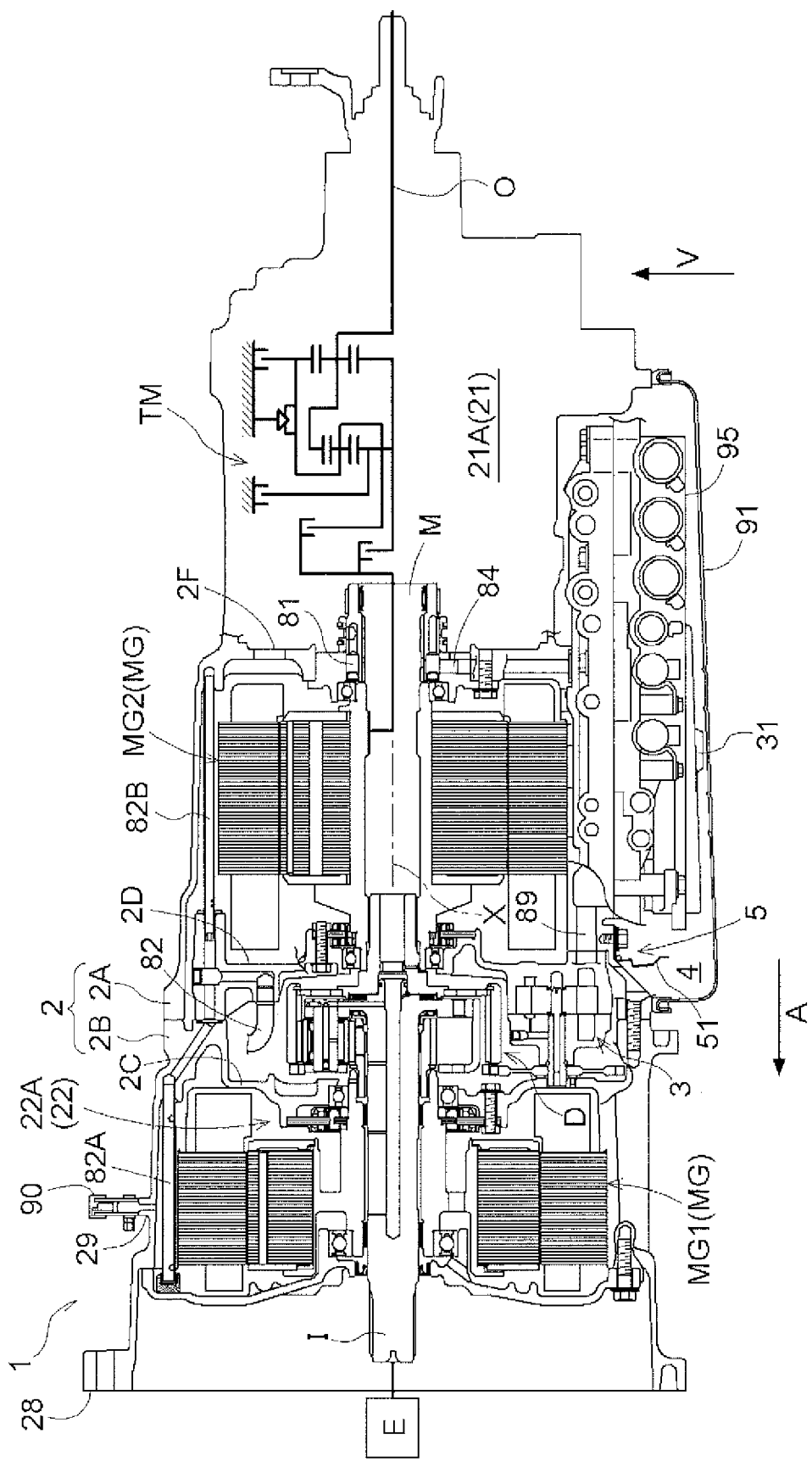
FIG. 1 is an entire cross-sectional view illustrating a vehicle drive device.

An embodiment of a vehicle drive device will be described with reference to the drawings. As illustrated in FIG. 1, a vehicle drive device 1 according to the present embodiment is a drive device for a hybrid vehicle that includes both an internal combustion engine E and rotary electric machines MG as a drive power source for the wheels (not illustrated, the same applies to the below). More specifically, the vehicle drive device 1 according to the present embodiment is a drive device for a hybrid vehicle of a so-called 2-motor split type including a power distribution device D. In the present embodiment, the vehicle drive device 1 is a drive device for an FR (Front Engine Rear Drive) vehicle. Note that in FIG. 1, hatching is appropriately omitted in consideration of clarity. Further, the term "rotary electric machine" as used herein refers to any of a motor (electric motor), a generator (electric generator), and a motor generator that serves as both a motor and a generator as necessary.

In the following description, the terms "above" and "below" or "under" are defined based on a vertical direction V in the state (the vehicle-mounted state) in which the vehicle drive device 1 is mounted on a vehicle (not illustrated, the same applies to the below). The term "above" represents the upper side in FIGS. 1 and 2, and the term "below" or "under" represents the lower side in FIGS. 1 and 2. Further, in the following description, the direction of each member indicates the direction of each member assembled in the vehicle drive device 1. The terms related to the size, arrangement direction, arrangement position, and so on (for example, parallel, orthogonal, coaxial, etc.) of each member are used as a concept including a margin of errors (allowable manufacturing errors).

Figure 2:
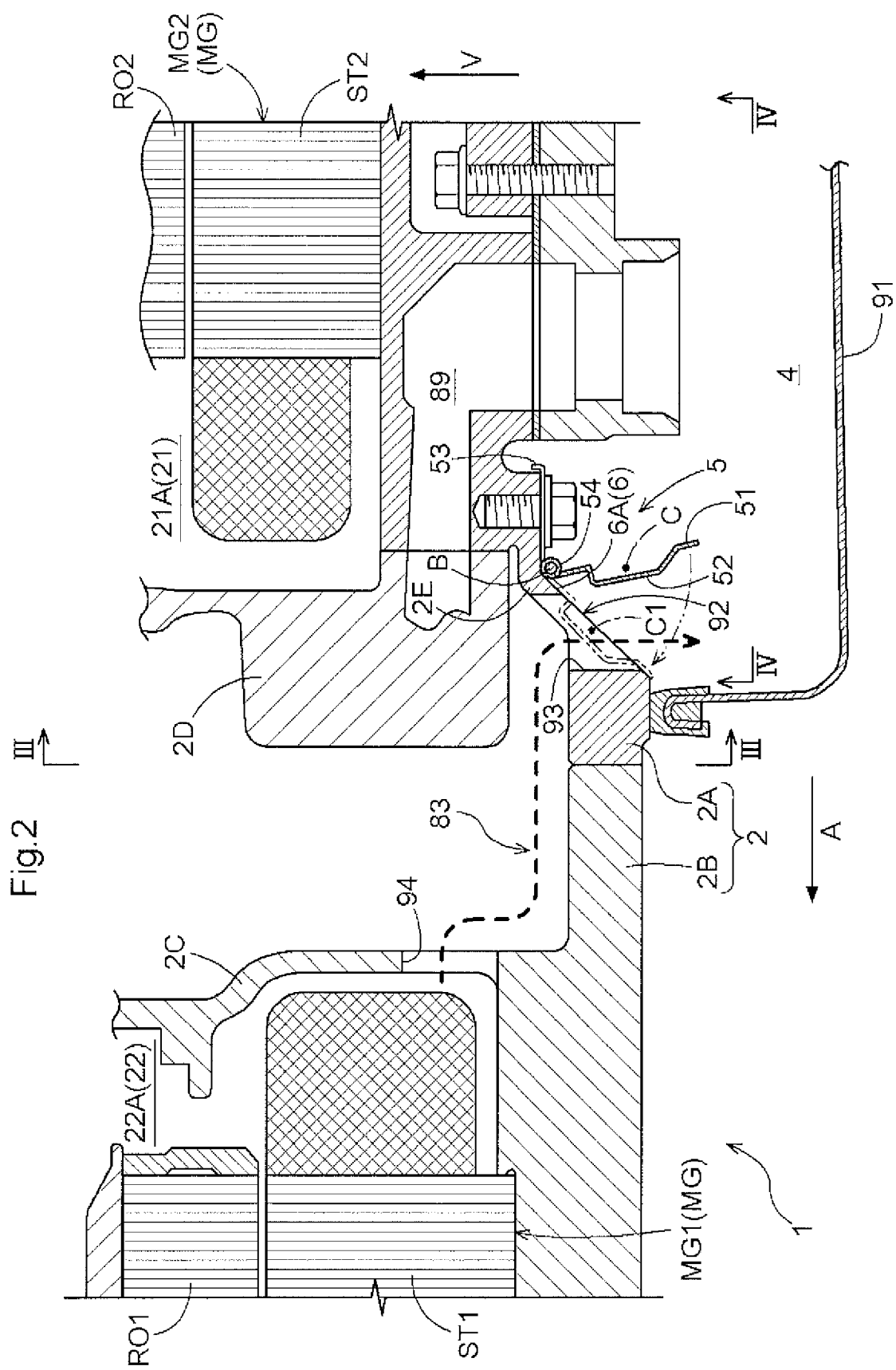
FIG. 2 is a partial cross-sectional view illustrating the vehicle drive device.

Further, in the following description, the term "drivingly coupled" refers to a state in which two rotary elements are coupled to each other in such a way that allows transmission of a driving force, including a state in which the two rotary elements are coupled to each other to rotate together, and a state in which the two rotary elements are coupled to each other via one or two or more transmission members in such a way that allows transmission of a driving force. Examples of such transmission members include various members that transmit rotation at an equal speed or a changed speed, such as a shaft, a gear mechanism, a belt, and a chain, for example. Examples of such transmission members may include an engagement device that selectively transmits rotation and a driving force, such as a friction engagement device and a meshing type engagement device, for example, 1. Overall Configuration of Vehicle Drive Device As illustrated in FIG. 1, the vehicle drive device 1 includes a case 2 forming a first accommodating space 21 and a second accommodating space 22. The case 2 includes an on-vehicle attachment portion 28 for attachment to a vehicle. The details of the on-vehicle attachment portion 28 will be described below. The first accommodating space 21 is a space that accommodates a speed change device TM, and the second accommodating space 22 is a space that accommodates a first rotary electric machine MG1. In the present embodiment, the case 2 includes a first case portion 2A and a second case portion 2B that are formed by splitting the case 2. The first case portion 2A forms the first accommodating space 21, and the second case portion 2B forms the second accommodating space 22. The first case portion 2A and the second case portion 2B are joined and unified with each other in a target direction A. As illustrated in FIGS. 1 and 2, the target direction A is a direction from the first accommodating space 21 toward the second accommodating space 22. As illustrated in FIG. 1, an attachment portion 29 (i.e., attachment) for a breather 90 is formed on a portion (the second case portion 2B in this example) of the case 2 forming the second accommodating space 22. A breather mechanism including the breather 90 and the attachment portion 29 allows a communication between the inside and the outside of the case 2, thereby reducing the pressure difference between the inside and the outside of the case 2. In the present embodiment, the attachment portion 29 is formed on the top of a peripheral wall portion of the second case portion 2B. Further, the attachment portion 29 is formed by a hole for insertion of the breather 90.

The first accommodating space 21 includes a first cylindrical portion 21A which is a cylindrical portion (i.e., cylinder) formed in a cylindrical shape. In the first cylindrical portion 21A, the speed change device TM is accommodated coaxially with the axis of the cylindrical portion. The first cylindrical portion 21A is formed by the peripheral wall portion which is a portion of the case 2 (the first case portion 2A in this example) covering the outer periphery of the speed change device TM. In the present embodiment, the first cylindrical portion 21A is formed coaxially with an axis X (see FIG. 1) parallel to the target direction A, and the speed change device TM is disposed coaxially with the axis X. In the present embodiment, a second rotary electric machine MG2 different from the first rotary electric machine MG1 is also accommodated in the first accommodating space 21. A portion of the first accommodating space 21 on the side of the target direction A with respect to a portion of the first accommodating space 21 accommodating the speed change device TM forms the space that accommodates the second rotary electric machine MG2. In the present embodiment, the second rotary electric machine MG2 is disposed coaxially with the axis X in the first cylindrical portion 21A toward the target direction A with respect to the speed change device TM. Note that the speed change device TM includes a mechanism capable of changing the speed ratio in a stepwise manner or in a stepless manner with a hydraulic pressure supplied through a first oil passage 81 (described below). In the present embodiment, the speed change device TM includes an automatic stepped speed change mechanism provided with a plurality of hydraulically-driven speed change engagement devices. The speed change device TM switches between a plurality of shift speeds by controlling the state of engagement of each of the plurality of speed change engagement devices. Further, as illustrated in FIGS. 1 and 2, the second rotary electric machine MG2 includes a second stator ST2 fixed to the case 2 (the first case portion 2A in this example) and a second rotor RO2 rotatably supported on the radially inner side of the second stator ST2.

The second accommodating space 22 includes a second cylindrical portion 22A which is a cylindrical portion formed in a cylindrical shape. In the second cylindrical portion 22A, the first rotary electric machine MG1 is accommodated coaxially with the axis of the cylindrical portion. The second cylindrical portion 22A is formed by a peripheral wall portion which is a portion of the case 2 (the second case portion 2B in this example) covering the outer periphery of the first rotary electric machine MG1. In the present embodiment, the second cylindrical portion 22A is formed coaxially with the axis X, and the first rotary electric machine MG1 is disposed coaxially with the axis X. That is, in the present embodiment, the first rotary electric machine MG1 and the speed change device TM are disposed coaxially with each other. Further, in the present embodiment, the second rotary electric machine MG2 is also disposed coaxially with the first rotary electric machine MG1 and the speed change device TM. Note that, as illustrated in FIGS. 1 and 2, the first rotary electric machine MG1 includes a first stator ST1 fixed to the case 2 (the second case portion 2B in this example) and a first rotor RO1 rotatably supported on the radially inner side of the first stator ST1.

As described above, in the present embodiment, each of the first accommodating space 21 and the second accommodating space 22 includes a cylindrical portion formed in a cylindrical shape and coaxial with the target direction A.

Further, in the present embodiment, the second cylindrical portion 22A as the cylindrical portion of the second accommodating space 22 is formed to have a greater diameter than the first cylindrical portion 21A as the cylindrical portion of the first accommodating space 21. In the present embodiment, as illustrated in FIG. 1, the first rotary electric machine MG1 is used that has a greater diameter than the second rotary electric machine MG2 and the speed change device TM, and accordingly the second cylindrical portion 22A is formed to have a greater diameter than the first cylindrical portion 21A.

Each of the first rotary electric machine MG1 and the second rotary electric machine MG2 is provided in the vehicle as a drive power source of the wheels. Further, in the present embodiment, the internal combustion engine E is also provided in the vehicle as a drive power source of the wheels. The internal combustion engine E is a motor (for example, a gasoline engine, a diesel engine, etc.) that is driven by combustion of fuel inside the engine such that power is output. As illustrated in FIG. 1, the internal combustion engine E is drivingly coupled to an input shaft I. The input shaft I is, for example, drivingly coupled to an output shaft of the internal combustion engine E to rotate therewith, or drivingly coupled to the output shaft of the internal combustion engine E via a damper and so on. In the present embodiment, as illustrated in FIG. 1, the internal combustion engine E is disposed toward the target direction A with respect to the first rotary electric machine MG1.

In the present embodiment, the vehicle drive device 1 includes the power distribution device D that distributes the output torque of the internal combustion engine E toward the first rotary electric machine MG1 and toward the second rotary electric machine MG2, and the speed change device TM. More specifically, the power distribution device D includes a first rotary element, a second rotary element, and a third rotary element in order of rotational speed, in other words, in order of arrangement in a velocity diagram (collinear chart). In the present embodiment, the power distribution device D includes a single-pinion type planetary gear mechanism. The first rotary element corresponds to a sun gear; the second rotary element corresponds to a carrier, and the third rotary element corresponds to a ring gear. Further, as illustrated in FIG. 1, the first rotary element is drivingly coupled to the first rotor RO1 (see FIG. 2) without via other rotary elements; the second rotary element is drivingly coupled to the input shaft I without via other rotary elements; and the third rotary element is drivingly coupled to an intermediate shaft M without via other rotary elements. In the present embodiment, the power distribution device D is disposed coaxially with the axis X. Further, in the present embodiment, the power distribution device D is disposed between the first rotary electric machine MG1 and the second rotary electric machine MG2 in the target direction A.

The speed change device TM changes the rotational speed of the intermediate shaft M serving as a shift input shaft with a current speed ratio, and transmits the resultant rotational speed to the output shaft O serving as a shift output shaft. The output shaft O is drivingly coupled to the wheels, so that the torque transmitted from the speed change device TM to the output shaft O is distributed and transmitted to the two right and left wheels via a differential gear unit (not illustrated). Note that the second rotor RO2 is drivingly coupled to the intermediate shaft M. In the present embodiment, the second rotor RO2 is drivingly coupled to the intermediate shaft M to rotate therewith. In the present embodiment, the input shaft I, the intermediate shaft M, and the output shaft O are disposed coaxially with the axis X. Further, in the present embodiment, the first rotary electric machine MG1, the power distribution device D, the second rotary electric machine MG2, and the speed change device TM are disposed in this order from the side of the target direction A along the axis X.

In the present embodiment, the case 2 includes a first intermediate wall portion 2C that defines the side of the second accommodating space 22 (more specifically, a portion of the second accommodating space 22 where the first rotary electric machine MG1 is accommodated) opposite to the side of the target direction A. The first intermediate wall portion 2C is formed to extend in the radial direction and the circumferential direction using the axis X as a reference, on the opposite side of the first rotary electric machine MG1 from the target direction A side. The first intermediate wall portion 2C is disposed between the speed change device TM and the first rotary electric machine MG1 in the target direction A, specifically between the second rotary electric machine MG2 and the first rotary electric machine MG1 in the target direction A, and more specifically between the power distribution device D and the first rotary electric machine MG1 in the target direction A. A through-hole for insertion of the input shaft I is formed in the center of the first intermediate wall portion 2C in the radial direction using the axis X as a reference, The input shaft I is supported via a bearing so as to be rotatable with respect to the first intermediate wall portion 2C. In the present embodiment, the first intermediate wall portion 2C is formed integrally with the second case portion 2B, In the present embodiment, the case 2 includes a second intermediate wall portion 2D that defines the side of the first accommodating space 21 toward the target direction A (more specifically, a portion of the first accommodating space 21 where the second rotary electric machine MG2 is accommodated). The second intermediate wall portion 2D is formed to extend in the radial direction and the circumferential direction using the axis X as a reference, on the side of the target direction A with respect to the speed change device TM (in this example, on the side of the target direction A with respect to the second rotary electric machine MG2). The second intermediate wall portion 2D is disposed between the second rotary electric machine MG2 and the first intermediate wall portion 2C in the target direction A, specifically between the second rotary electric machine MG2 and the power distribution device D in the target direction A. A through-hole for insertion of the intermediate shaft M is formed at the center of the second intermediate wall portion 2D in the radial direction using the axis X as a reference, The intermediate shaft M is supported via a bearing so as to be rotatable with respect to the second intermediate wall portion 2D. In the present embodiment, the second intermediate wall portion 2D is joined to the first case portion 2A from the side of the target direction A. Further, in the present embodiment, the case 2 includes a third intermediate wall portion 2F that is formed to extend in the radial direction and the circumferential direction using the axis X as a reference, between the speed change device TM and the second rotary electric machine MG2 in the target direction A.

As illustrated in FIGS. 1 and 2, the vehicle drive device I includes an oil storing portion 4 (i.e., oil storage), a hydraulic pump 3, a first oil passage 81, a second oil passage 82, and a third oil passage 83. The oil storing portion 4 is a portion that stores oil, and is disposed under the first accommodating space 21. That is, the oil storing portion 4 is disposed in a position overlapping the first accommodating space 21, at the closer side to the viewer than the first accommodating space 21 (lower side), as viewed from the lower side in the vertical direction V. In the present embodiment, an oil pan 91 is fixed to the lower part of the first case portion 2A, and the space surrounded by at least a peripheral wall portion of the first ease portion 2A and the oil pan 91 forms the oil storing portion 4.

The hydraulic pump 3 includes a suction portion 31 that suctions oil from the oil storing portion 4. The suction portion 31 includes a strainer (not illustrated) for filtering oil, and is disposed in the oil storing portion 4. A suction port of the suction portion 31 is located below the oil level in the oil storing portion 4 during rotation or drive of the hydraulic pump 3. Here, the oil level refers to the oil level in a state in which no inertia force is applied to the oil storing portion 4, for example, in a state in which the vehicle is traveling straight at a constant speed or the vehicle is stopped. The hydraulic pump 3 suctions oil from the oil storing portion 4 via the suction portion 31 and generates a hydraulic pressure. In the present embodiment, the hydraulic pump 3 is driven by a drive power source of the wheels (in this example, the internal combustion engine E and the rotary electric machines MG). Further, in the present embodiment, as illustrated in FIG. 1, the hydraulic pump 3 is disposed in a position overlapping the power distribution device D as viewed in the radial direction, radially outward of the power distribution device D, Examples of the hydraulic pump 3 may include an internal gear pump, an external gear pump, and a vane pump. When the hydraulic pump 3 is operating, oil suctioned by the suction portion 31 is guided to a suction port of the hydraulic pump 3 through a suction oil passage 89 (see FIGS. 1 and 2), and oil discharged from a discharge port of the hydraulic pump 3 is guided to a hydraulic control device 95 through a discharge oil passage.

The hydraulic control device 95 is a device that controls the hydraulic pressure supplied from the hydraulic pump 3. Note that in FIG. 2, the hydraulic control device 95 is omitted. The hydraulic control device 95 includes a hydraulic pressure control valve and an oil passage, and controls the hydraulic pressure to be supplied to the components of the vehicle drive device 1. In the present embodiment, the hydraulic control device 95 is disposed in the oil storing portion 4. More specifically, the hydraulic control device 95 is fixed to a portion of the outer periphery (in this example, the lowermost part of the outer periphery) of the peripheral wall portion of the first case portion 2A, the portion having a surface facing downward. The hydraulic pressure controlled by the hydraulic control device 95 is supplied to the speed change device TM through the first oil passage 81. In the present embodiment, the hydraulic pressure is supplied to the speed change device TM through a fourth oil passage 84 (described below) as well. Further, the hydraulic pressure controlled by the hydraulic control device 95 is supplied to the first rotary electric machine MG1 through the second oil passage 82. In the present embodiment, the hydraulic pressure is also supplied to the second rotary electric machine MG2 through the second oil passage 82.

The first oil passage 81 is an oil passage that supplies the oil discharged by the hydraulic pump 3 to the speed change device TM as hydraulic oil. The speed change device TM operates in accordance with the hydraulic pressure supplied through the first oil passage 81 and establishes a target shift speed. As described above, in the present embodiment, the speed change device TM includes hydraulically-driven speed change engagement devices, and the first oil passage 81 communicates with a hydraulic pressure chamber of the speed change engagement devices. By controlling the hydraulic pressure in the hydraulic pressure chamber to slide a piston that presses an engagement member, the state in which the speed change engagement devices are engaged is controlled. In the present embodiment, the vehicle drive device 1 further includes the fourth oil passage 84 that supplies the oil discharged by the hydraulic pump 3 to the speed change device TM as lubricating oil or cooling oil. In the present embodiment, each of the first oil passage 81 and the fourth oil passage 84 includes a portion formed by the third intermediate wall portion 2F.

The second oil passage 82 is an oil passage that supplies the oil discharged by the hydraulic pump 3 to the first rotary electric machine MG1 as cooling oil. In the present embodiment, the second oil passage 82 is configured to also supply the oil discharged by the hydraulic pump 3 to the second rotary electric machine MG2 as cooling oil. That is, as illustrated in FIG. 1, the second oil passage 82 includes a first cooling oil passage 82A for cooling the first rotary electric machine MG1 and a second cooling oil passage 82B for cooling the second rotary electric machine MG2. In the present embodiment, as illustrated in FIG, 1, the second oil passage 82 is configured to branch into the first cooling oil passage 82A and the second cooling oil passage 82B, on the downstream side. Further, in the present embodiment, the first cooling oil passage 82A is configured to supply oil as cooling oil to a coil end portion included in the first rotary electric machine MG1 (first stator ST1) from the upper side, and the second cooling oil passage 82B is configured to supply oil as cooling oil to a coil end portion included in the second rotary electric machine MG2 (second stator ST2) from the upper side. In the present embodiment, the second oil passage 82 has a portion formed by the second intermediate wall portion 2D. Although not described in detail here, the second oil passage 82 may include an oil passage that supplies oil as cooling oil to the first rotary electric machine MG1 or the second rotary electric machine MG2 from the radially inner side.

As illustrated in FIG. 2, the third oil passage 83 is an oil passage that returns the oil supplied to the first rotary electric machine MG1, from the second accommodating space 22 to the oil storing portion 4, by allowing the oil to flow in the direction from the second accommodating space 22 toward the first accommodating space 21 (direction toward the side opposite to the target direction A). The third oil passage 83 includes an opening portion 92 (i.e., opening) that is open toward the oil storing portion 4 such that the oil flowing through the third oil passage 83 is supplied from the opening portion 92 to the oil storing portion 4. As described above, oil for cooling is supplied to the first rotary electric machine MG1 through the second oil passage 82. Then, the oil supplied to the first rotary electric machine MG1 moves to a lower part of the second accommodating space 22 under the effect of gravity. The third oil passage 83 is an oil passage for allowing the oil moved to the lower part of the second accommodating space 22 to flow to the oil storing portion 4. Although not described in detail here, the oil for cooling supplied to the second rotary electric machine MG2 through the second oil passage 82 and the oil for cooling or lubrication supplied to the speed change device TM through the fourth oil passage 84 move to a lower part of the first accommodating space 21 under the effect of gravity, and return to the oil storing portion 4 disposed under the first accommodating space 21 via an opening portion or the like formed in the peripheral wall portion of the first case portion 2A.

As illustrated in FIG. 2, in the present embodiment, the third oil passage 83 includes a discharge hole 94 and an introduction hole 93 in this order from the upstream side in the oil flow direction. As described above, in the present embodiment, the case 2 includes the first intermediate wall portion 2C that defines the side of the second accommodating space 22 (more specifically, a portion of the second accommodating space 22 where the first rotary electric machine MG1 is accommodated) opposite to the target direction A, and the discharge hole 94 is a through-hole extending through the first intermediate wall portion 2C in the target direction A. In the present embodiment, the discharge hole 94 is disposed in a portion of the first intermediate wall portion 2C corresponding to the lowermost part of the second accommodating space 22 or in the vicinity thereof. Accordingly, as indicated by the dashed arrow schematically representing the oil flow in FIG. 2, the oil supplied to the first rotary electric machine MG1 is discharged from the second accommodating space 22 to the side opposite to the target direction A via the discharge hole 94.

The introduction hole 93 is a through-hole extending through a partition wall portion 2E (i.e., partition wall) that defines the oil storing portion 4, and a part of the introduction hole 93 that is open toward the oil storing portion 4 forms the opening portion 92.

Further, as illustrated in FIG. 2, the discharge hole 94, the introduction hole 93, and the surrounding areas are configured such that the oil discharged from the discharge hole 94 to the side opposite to the target direction A flows to the side opposite to the target direction A along the inner wall surface portion in the lower area of the case 2 and is supplied to the introduction hole 93. For example, in the present embodiment, the introduction hole 93 is formed below the discharge hole 94. Accordingly, it is possible to return the oil supplied to the first rotary electric machine MG1 to the oil storing portion 4 through the third oil passage 83.

As described above, the opening portion 92 is formed in the partition wall portion 2E. In the present embodiment, the partition wall portion 2E is disposed between the portion of the first accommodating space 21 accommodating the second rotary electric machine MG2 and the portion of the second accommodating space 22 accommodating the first rotary electric machine MG1 in the target direction A. Further, the partition wall portion 2E is configured to define at least the side of the oil storing portion 4 toward the target direction A. In the present embodiment, the partition wall portion 2E is configured to define the side of the target direction A and the upper side of the oil storing portion 4. Further, in the present embodiment, the partition wall portion 2E is configured to, together with the first intermediate wall portion 2C, separate the second accommodating space 22 and the oil storing portion 4. Further, in the present embodiment, the partition wall portion 2E includes a part of the peripheral wall portion of the first case portion 2A, and a clearance that allows the oil discharged from the discharge hole 94 to flow through is formed between the partition wall portion 2E and the second intermediate wall portion 2D.

Figure 3:
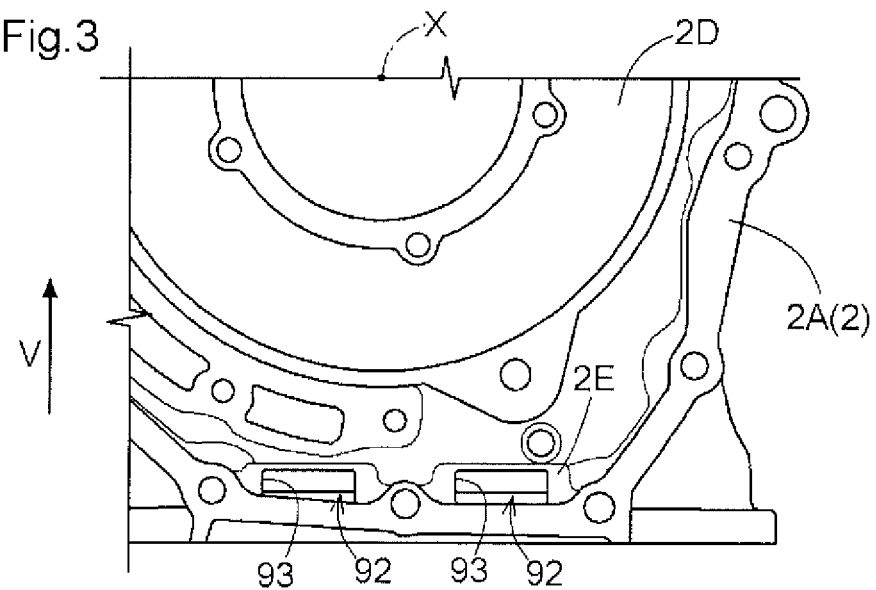
FIG. 3 is a cross-sectional view taken along line III-III of FIG. 2.
Figure 4:
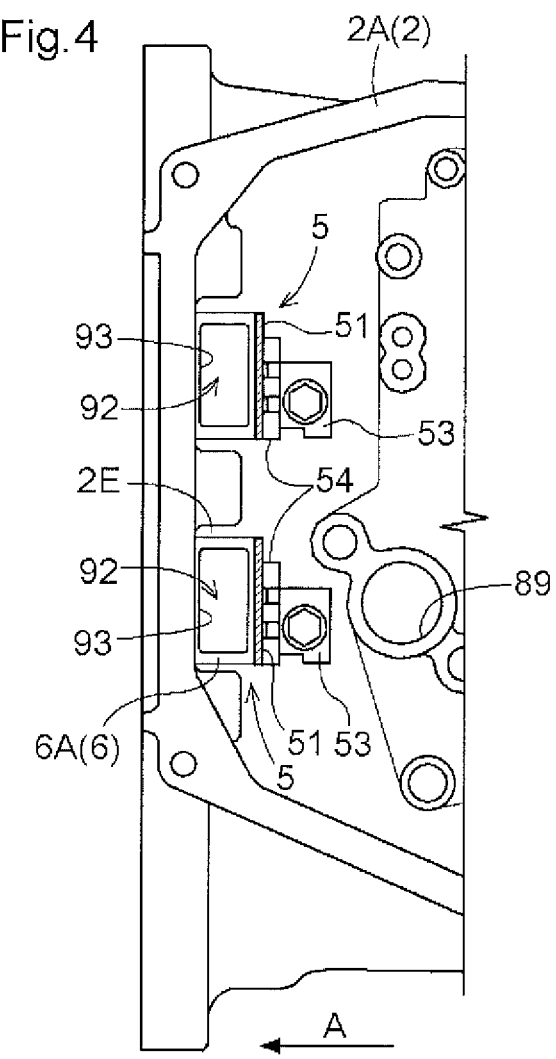
FIG. 4 is a cross-sectional view taken along line IV-IV of FIG. 2.

Further, in the present embodiment, an inner wall surface portion 6 (i.e., inner wall surface) (a wall surface portion facing the oil storing portion 4) of the partition wall portion 2E defining the oil storing portion 4 includes an inclined face 6A that extends downward in the target direction A. Further, in the present embodiment, the introduction hole 93 is formed to be open in a portion of the inner wall surface portion 6 where the inclined face 6A is formed such that the opening portion 92 is formed in the inclined face 6A. In the present embodiment, the introduction hole 93 is formed to extend through the partition wall portion 2E in the vertical direction V. Further, in the present embodiment, as illustrated in FIGS. 3 and 4, a plurality of (two in this example) introduction holes 93 are provided in different positions in the horizontal direction orthogonal to the target direction A (the direction orthogonal to both the target direction A and the vertical direction V). Further, the same number of opening/closing mechanisms 5 as the number of introduction holes 93 is provided corresponding to each of the plurality of introduction holes 93.

2. Configuration of Opening/Closing Mechanism

Next, the configuration of the opening/closing mechanism 5 will be described. The opening/closing mechanism 5 is disposed in the third oil passage 83 and opens and closes the third oil passage 83. The opening/closing mechanism 5 is configured to open the third oil passage 83 if target direction acceleration is less than or equal to a predetermined setting value, and close the third oil passage 83 if the target direction acceleration is greater than the setting value. Here, the target direction acceleration refers to acceleration in the target direction A applied to the opening/closing mechanism 5. The target direction acceleration is given by the sum of the component of the gravitational acceleration in the target direction A, and the inertia force in the target direction A applied to the opening/closing mechanism 5 divided by the mass of the opening/closing mechanism 5 (mass of an opening/closing member 51 in this example). Note that the setting value is set to a positive value.

In the vehicle-mounted state in which the vehicle drive device 1 is mounted on the vehicle, the target direction A coincides with the direction toward the front of the vehicle. That is, the on-vehicle attachment portion 28 of the case 2 is configured such that the target direction A coincides with the direction toward the front of the vehicle in a state in which the case 2 is attached to the vehicle. Here, the term "direction toward the front of the vehicle" as used herein refers to any direction as long as the inner product of the direction toward the front of the vehicle and a reference direction is positive when the reference direction is defined as the direction parallel to the vehicle front-rear direction and toward the front of the vehicle (the moving direction of the center of gravity of the vehicle traveling straight in the forward direction). That is, the on-vehicle attachment portion 28 is configured such that the target direction A is parallel to the reference direction in the vehicle-mounted state, or is configured such that the target direction A intersects the reference direction at an acute angle (for example, the target direction A is inclined upward at an angle of 5 degrees to 10 degrees with respect to the reference direction) in the vehicle-mounted state. Note that it is assumed for simplicity that the target direction A is parallel to the reference direction in the vehicle-mounted state.

In the present embodiment, as illustrated in FIG. 1, the on-vehicle attachment portion 28 is a flange portion for attaching the case 2 to the internal combustion engine E. In the present embodiment, since the internal combustion engine E is disposed toward the target direction A with respect to the case 2, the case 2 is mounted on the vehicle such that the side of the case 2 connected to the internal combustion engine E faces the front of the vehicle. The on-vehicle attachment portion 28 is not limited to an attachment portion for attachment to the internal combustion engine E, and may be an attachment portion for attaching the case 2 to another device fixed to the vehicle or may be an attachment portion for attaching the case 2 directly to the vehicle body.

As described above, in the vehicle-mounted state, the target direction A coincides with the direction toward the front of the vehicle. Therefore, the target direction acceleration includes the inertia force in the target direction A applied to the opening/closing mechanism 5. The inertia force divided by the mass of the opening/closing mechanism 5 is a value obtained by inverting the positive or negative sign of the acceleration of the vehicle. Further, the target direction acceleration includes the component of the gravitational acceleration in the target direction A. This component increases as the inner product of the direction of the gravitational acceleration (the downward direction in the vertical direction V) and the target direction A increases. In other words, this component increases as the magnitude of the downward gradient of the road on which the vehicle is traveling increases. Accordingly, at least when the vehicle is decelerating or when the vehicle is traveling on a descending slope, if the magnitude of the deceleration, the magnitude of the downward gradient, or the combined magnitude of both of the above factors is at a level such that the target direction acceleration exceeds the setting value, the third oil passage 83 is closed by the opening/closing mechanism 5.

In the present embodiment, as illustrated in FIG. 2, the opening/closing mechanism 5 includes the opening/closing member 51. The opening/closing member 51 is a member swingable about a swing axis B extending in the horizontal direction orthogonal to the target direction A, and is a member having a center of gravity C below the swing axis B. The opening/closing member 51 is supported on the case 2 so as to be swingable about the swing axis B, by a fixing portion 53 fixed to the case 2. That is, the opening/closing member 51 and the fixing portion 53 are coupled to each other at a coupling portion 54 so as to be swingable about the swing axis B. In the present embodiment, as illustrated in FIG. 4, the coupling portion 54 is a coupling portion using a hinge. Further, in the present embodiment, the fixing portion 53 is fastened and fixed to the case 2 (in this example, the peripheral wall portion of the first case portion 2A) from the lower side.

The swing axis B is disposed on the opposite side of the opening portion 92 from the side of the target direction A, and above the opening portion 92. Then, the opening/closing member 51 is configured to swing such that the center of gravity C moves to a setting position C1 that is set on the side of the target direction A with respect to the swing axis B to close the opening portion 92. As described above, in the present embodiment, the opening portion 92 is formed in the inclined face 6A that extends downward in the target direction A. As indicated by the two-dot chain line in FIG. 2, the opening/closing member 51 is configured to abut against the inclined face 6A around the opening portion 92 when the opening/closing member 51 swings such that the center of gravity C is moved to the setting position C1, that is, when the opening portion 92 is closed. In the present embodiment, the opening/closing member 51 is configured to abut against the inclined face 6A throughout the circumference of the opening portion 92 when the opening portion 92 is closed.

Further, in the present embodiment, a projecting portion 52 (i.e., projection) that projects in the target direction A is formed in a closing portion (i.e., closing) of the opening/closing member 51 that closes the opening portion 92. The projecting portion 52 is configured to be accommodated inside the introduction hole 93 when the opening/closing member 51 closes the opening portion 92. Note that the closing portion is a portion of the opening/closing member 51 overlapping the opening portion 92 as viewed in an opening direction of the opening portion 92 (the direction orthogonal to the inclined face 6A) when the opening portion 92 is closed by the opening/closing member 51.

For example, when the vehicle is traveling straight at a constant speed or when the vehicle is stopped on a road with a gradient of zero, acceleration in the target direction A is not applied to the opening/closing mechanism 5. The position of the center of gravity C of the opening/closing member 51 under the condition where acceleration in the target direction A is not applied to the opening/closing mechanism 5 is defined as the initial position. When acceleration in the target direction A (target direction acceleration) is applied to the opening/closing mechanism 5, the opening/closing member 51 swings clockwise in FIG. 2 such that the center of gravity C moves toward the setting position C1 if the target direction acceleration is positive, and the opening/closing member 51 swings counterclockwise in FIG. 2 such that the center of gravity C moves to the side opposite to the setting position C1 if the target direction acceleration is negative. If the target direction acceleration exceeds the setting value, the center of gravity C of the opening/closing member 51 moves from the initial position to the setting position C1. Accordingly, the setting value is a value based on the swing angle of the opening/closing member 51 for moving the center of gravity C from the initial position to the setting position C1. In the present embodiment, the swing angle is set to about 45 degrees.

In the case where oil in the oil storing portion 4 flows back toward the second accommodating space 22 through the third oil passage 83 and thus the oil level in the oil storing portion 4 is reduced, the hydraulic pump 3 might suction air. Therefore, in this regard, it is preferable that the swing angle is set to be small enough to make the third oil passage 83 easily closed during braking of the vehicle or the like which may cause the backflow. However, if the swing angle is too small, even when the vehicle is traveling on a descending slope with a small gradient, the third oil passage 83 is closed, which interferes with the flow of oil to the oil storing portion 4 through the third oil passage 83. In this case, a large amount of oil is stored in the second accommodating space 22, so that energy loss occurs due to agitation of the oil in the second accommodating space 22 by the first rotor RO1. Further, oil might be ejected from the breather 90. In view of the above, it is preferable that the swing angle is set to be large enough to appropriately reduce occurrence of suction of air by the hydraulic pump 3. For example, in the present embodiment, the swing angle is set to about 45 degrees.

In the present embodiment, the initial position of the center of gravity C is located in a position below the swing axis B and overlapping the swing axis B as viewed in the vertical direction V (see the opening/closing member 51 indicated by the solid line in FIG. 1). This configuration is attained in the case where a biasing member that biases the opening/closing member 51 with respect to the fixing portion 53 in the swing direction is not provided, for example. Note that a biasing member that biases the opening/closing member 51 with respect to the fixing portion 53 in the swing direction may be provided. In this case, the setting value is a value based on the biasing force of the biasing member as well as the swing angle of the opening/closing member 51 for moving the center of gravity C from the initial position to the setting position C1.

3. Other Embodiments

Lastly, other embodiments of the vehicle drive device 1 will be described. The configuration disclosed in each of the following embodiments may be applied in combination with the configuration disclosed in other embodiments as long as no inconsistency arises.

(1) In the above embodiment, an example has been described in which the opening portion 92 is formed in the inclined face 6A that extends downward toward the target direction A. However, embodiments of the vehicle drive device 1 are not limited thereto. The opening portion 92 may be formed in a face orthogonal to the target direction A. Even in this case, for example, by appropriately setting the shape of the opening/closing member 51 (for example, the shape of the projecting portion 52 or the like), or by providing a biasing member that biases the opening/closing member 51 with respect to the fixing portion 53 in the swing direction, it is possible to appropriately set the swing angle of the opening/closing member 51 for moving the center of gravity C from the initial position to the setting position C1.

(2) In the embodiment described above, an example has been described in which the setting position C1 is set on the side of the target direction A with respect to the swing axis B. However, embodiments of the vehicle drive device 1 are not limited thereto. The setting position C1 may be set in the same position as that of the swing axis B in the target direction A. In this case, for example, by providing a biasing member that biases the opening/closing member 51 with respect to the fixing portion 53 in the swing direction and thereby setting the initial position of the center of gravity C on the opposite side of the setting position C1 from the target direction A side, it is possible to appropriately set the swing angle of the opening/closing member 51 for moving the center of gravity C from the initial position to the setting position C1.

(3) In the above embodiment, an example has been described in which the projecting portion 52 that projects in the target direction A is formed in the closing portion of the opening/closing member 51 that closes the opening portion 92. However, embodiments of the vehicle drive device 1 are not limited thereto. The projecting portion 52 may not be formed in the closing portion. For example, the opening/closing member 51 may have a planar shape as viewed along the horizontal direction orthogonal to the target direction A.

(4) In the above embodiment, an example has been described in which the attachment portion 29 for the breather 90 is formed on a portion of the case 2 forming the second accommodating space 22. However, embodiments of the vehicle drive device 1 are not limited thereto. The attachment portion for the breather may be formed on a portion of the case 2 forming the first accommodating space 21.

(5) In the above embodiment, an example has been described in which the second rotary electric machine MG2 is accommodated in the first accommodating space 21. However, embodiments of the vehicle drive device 1 are not limited thereto. The second rotary electric machine MG2 may not be accommodated in the first accommodating space 21. For example, the second rotary electric machine MG2 may be accommodated in the second accommodating space 22. Further, for example, the vehicle drive device 1 may be a drive device for a one-motor parallel type hybrid vehicle which includes only the first rotary electric machine MG1 out of the first rotary electric machine MG1 and the second rotary electric machine MG2. Note that in the case of the one-motor parallel type, the internal combustion engine E and the first rotary electric machine MG1 are drivingly coupled in series to each other directly or via an engagement device.

(6) In the above embodiment, an example has been described in which the vehicle drive device 1 is a drive device for a hybrid vehicle that includes both the internal combustion engine E and the rotary electric machines MG as a drive power source for the wheels. However, embodiments of the vehicle drive device 1 are not limited thereto. The vehicle drive device 1 may be a drive device for an electric vehicle that includes only the rotary electric machine MG (only the first rotary electric machine MG1, or both the first rotary electric machine MG1 and the second rotary electric machine MG2) as a drive power source for the wheels.

(7) Regarding other configurations as well, the embodiments disclosed herein are merely examples in all respects, and it should be understood that the technical scope of the vehicle drive device is not limited thereto. It will be readily apparent to those skilled in the art that various modifications and changes can be made without departing from the spirit of the disclosure. Accordingly, it is obvious that other embodiments that are modified without departing from the spirit of the disclosure are within the technical scope of the vehicle drive device.

Summary of Embodiments

The following provides a brief summary of the vehicle drive device (1) described above.

According to an aspect, the vehicle drive device (1) includes: a case (2) forming a first accommodating space (21) that accommodates a speed change device (TM) and a second accommodating space (22) that accommodates a rotary electric machine (MG1);

an oil storing portion (4) that is disposed under the first accommodating space (21) and stores oil;

a hydraulic pump (3) including a suction portion (31) that suctions the oil from the oil storing portion (4);

a first oil passage (81) that supplies the oil discharged by the hydraulic pump (3) to the speed change device (TM) as hydraulic oil;

a second oil passage (82) that supplies the oil discharged by the hydraulic pump (3) to the rotary electric machine (MG1) as cooling oil; and a third oil passage (83) that returns the oil supplied to the rotary electric machine (MG1), from the second accommodating space (22) to the oil storing portion (4), by allowing the oil to flow in a direction from the second accommodating space (22) toward the first accommodating space (21); wherein a direction from the first accommodating space (21) toward the second accommodating space (22) is a target direction (A), and the target direction (A) coincides with a direction toward a front of the vehicle in a state where the case (2) is attached to the vehicle;

the third oil passage (83) includes an opening/closing mechanism (5) that opens and closes the third oil passage (83), and an opening portion (92) that is open toward the oil storing portion (4);

the opening/closing mechanism (5) includes an opening/closing member (51) that is swingable about a swing axis (B) extending in a horizontal direction orthogonal to the target direction (A), and that has a center of gravity (C) below the swing axis (B); and the opening/closing member (51) is configured to swing such that the center of gravity (C) moves in the target direction (A) to close the opening portion (92).

According to this configuration, the vehicle drive device (1) is attached to the vehicle such that the target direction (A) coincides with the direction toward the front of the vehicle.

Further, the third oil passage (83) including the opening portion (92) that is open toward the oil storing portion (4) further includes the opening/closing mechanism (5) that opens and closes the opening portion (92). The opening/closing mechanism (5) includes the opening/closing member (51). The opening/closing member (51) swings such that the center of gravity (C) of the opening/closing member (51) moves in the target direction (A) to close the opening portion (92).

For example, when the vehicle is traveling at a constant speed on a road with a gradient of zero, the acceleration in the target direction (A) is not large enough to swing the center of gravity (C) of the opening/closing member (51) in the target direction (A). Accordingly, it is possible to appropriately return the oil supplied to the rotary electric machine (MG1) from the second accommodating space (22) to the oil storing portion (4) through the third oil passage (83). Accordingly, it is possible to prevent a large amount of oil from being stored in the second accommodating space (22) and to reduce energy loss due to agitation of the oil by the rotary electric machine accommodated in the second accommodating space (22) (MG1). Further, the oil level in the oil storing portion (4) can be maintained high enough to prevent suction of air by the hydraulic pump (3). The same applies to the case where the vehicle is traveling on a descending slope, for example. More specifically, the same applies to the case where the downward gradient is small enough not to make the acceleration in the target direction (A) large enough to swing the center of gravity (C) of the opening/closing member (51) in the target direction (A).

On the other hand, during sudden braking of the vehicle or when the vehicle is traveling on a descending slope with a large gradient, the acceleration in the target direction (A) increases. If the acceleration is large enough to move the center of gravity (C) of the opening/closing member (51) in the target direction (A) and close the opening portion (92), the third oil passage (83) is closed, so that the amount of oil that flows back through the third oil passage (83) can be reduced. Therefore, it is possible to prevent oil from flowing from the oil storing portion (4) through the third oil passage (83) and being discharged toward the second accommodating space (22). Accordingly, it is possible to prevent the oil level in the oil storing portion (4) from being greatly reduced, and thus to maintain the oil level in the oil storing portion (4) high enough to prevent suction of air by the hydraulic pump (3). Thus, with the configuration described above, it is possible to appropriately allow oil to flow through the oil passage (the third oil passage (83)) that returns oil to the oil storing portion (4) during normal travel of the vehicle except for during braking, and to reduce the amount of oil that flows back through the oil passage (the third oil passage (83)) during sudden braking of the vehicle.

Further, it is preferable that the opening/closing member (51) is configured to open the opening portion (92) if target direction acceleration is less than or equal to a setting value, and close the opening portion (92) if the target direction acceleration is greater than the setting value, the target direction acceleration being acceleration in the target direction (A) applied to the opening/closing member (51), According to this configuration, if the target direction acceleration is less than or equal to the setting value, the opening portion (92) is opened, so that oil can flow through the third oil passage (83). On the other hand, if the target direction acceleration is greater than the setting value, the opening portion (92) is closed by the opening/closing mechanism (5) (the opening/closing member (51)), so that oil is prevented from flowing through the third oil passage (83). It is preferable that the setting value is greater than the target direction acceleration at the time when the vehicle is traveling straight at a constant speed on a road with a gradient of zero and at the time when the vehicle is traveling on a descending slope with a relatively small gradient, for example. On the other hand, it is preferable that the setting value is less than the target direction acceleration during sudden braking of the vehicle and at the time when the vehicle is traveling on a descending slope with a large gradient, for example. That is, during normal travel, the target direction acceleration does not exceed the setting value, so that oil is appropriately allowed to flow to the oil storing portion (4) through the third oil passage (83). Further, during sudden braking of the vehicle, the target direction acceleration exceeds the setting value, so that the amount of oil that flows back through the third oil passage (83) can be reduced.

Further, it is preferable that an inner wall surface portion (6) defining the oil storing portion (4) includes an inclined face (6A) that extends downward in the target direction (A), and the opening portion (92) is formed in the inclined face (6A).

According to this configuration, it is possible to set the position of the center of gravity (C) of the opening/closing member (51) under the condition where acceleration in the target direction A is not applied to the opening/closing mechanism (5) to a position below the swing axis (B) and overlapping the swing axis (B) as viewed in a vertical direction (V). In this case, even without a biasing member that biases the opening/closing member (51) in the swing direction, it is possible to maintain the third oil passage (83) open if the target direction acceleration is less than or equal to the setting value. On the other hand, if the target direction acceleration is greater than the setting value, the opening/closing member (51) swings to close the third oil passage (83). Therefore, it is possible to simplify the configuration of the opening/closing mechanism (5).

Further, it is preferable that a projecting portion (52) that projects in the target direction (A) is formed in a closing portion of the opening/closing member (51) that closes the opening portion (92).

According to this configuration, in a state where the opening portion (92) is not closed by the opening/closing member (51), the flow passage through which oil flows from the oil storing portion (4) into the opening portion (92) can be narrowed by the projecting portion (52). Accordingly, even when the opening portion (92) is not closed with the opening/closing member (51), the amount of oil discharged from the oil storing portion (4) toward the second accommodating space (22) can be appropriately reduced.

Further, it is preferable that: the rotary electric machine (MG1) is a first rotary electric machine (MG1), and a portion of the first accommodating space (21) on the side of the target direction (A) with respect to a portion of the first accommodating space (21) accommodating the speed change device (TM) forms a space that accommodates a second rotary electric machine (MG2) different from the first rotary electric machine MG1; a partition wall portion (2E) that separates the second accommodating space (22) and the oil storing portion (4) is disposed between the portion of the first accommodating space (21) accommodating the second rotary electric machine (MG2) and the portion of the second accommodating space 22 accommodating the first rotary electric machine (MG1) in the target direction (A); and the opening portion (92) is formed in the partition wall portion (2E).

According to this configuration, the wall portion in which the opening portion (92) is formed is the wall portion that separates the second accommodating space (22) as the source of the oil flow through the third oil passage (83) and the oil storing portion (4) as the destination of the oil flow, and therefore the third oil passage (83) can be formed with a relatively simple configuration.

Further, it is preferable that an attachment portion (29) for a breather (90) is formed on a portion of the case (2) forming the second accommodating space (22).

In the case where the attachment portion (29) for the breather (90) is formed on the portion of the case (2) forming the second accommodating space (22), it is desired that the amount of oil in the second accommodating space (22) can be reduced so as to reduce the amount of oil ejected from the breather (90). As mentioned above, the vehicle drive device (1) is capable of appropriately allowing oil to flow through the third oil passage (83) to the oil storing portion (4) during normal travel of the vehicle except for during braking, and reducing the amount of oil that flows back through the third oil passage (83) during sudden braking of the vehicle. Accordingly, the vehicle drive device (1) with the configuration described above is particularly suitable in the case where the attachment portion (29) for the breather (90) is formed on the portion of the case (2) forming the second accommodating space (22).

Further, it is preferable that each of the first accommodating space (21) and the second accommodating space (22) includes a cylindrical portion (21A, 22A) formed in a cylindrical shape and coaxial with the target direction (A), and the cylindrical portion (22A) of the second accommodating space (22) is formed to have a greater diameter than the cylindrical portion (21A) of the first accommodating space (21).

The cylindrical portion (21A) of the first accommodating space (21) is referred to as a first cylindrical portion (21A), and the cylindrical portion (22A) of the second accommodating space (22) is referred to as a second cylindrical portion (22A). In the case where the second cylindrical portion (22A) is formed to have a greater diameter than the first cylindrical portion (21A), compared to the case where the second cylindrical portion (22A) is formed to have a smaller diameter than the first cylindrical portion (21A), a greater amount of oil is likely to be stored in the second accommodating space (22). As mentioned above, the vehicle drive device (1) is capable of appropriately allowing oil to flow through the third oil passage (83) to the oil storing portion (4) during normal travel of the vehicle except for during braking, and reducing the amount of oil that flows back through the third oil passage (83) during sudden braking of the vehicle. Accordingly, the vehicle drive device (1) with the configuration described above is also suitable in the case where the second cylindrical portion (22A) of the second accommodating space (22) is formed to have a greater diameter than the cylindrical portion (21A) of the first accommodating space (21).

The invention claimed is:
1. A vehicle drive device comprising:
   a case forming a first accommodating space that accommodates a speed change device and a second accommodating space that accommodates a rotary electric machine;
   an oil storage that is disposed under the first accommodating space and stores oil;
   a hydraulic pump including a suction that suctions the oil from the oil storage;

a first oil passage that supplies the oil discharged by the hydraulic pump to the speed change device as hydraulic oil;

a second oil passage that supplies the oil discharged by the hydraulic pump to the rotary electric machine as cooling oil; and a third oil passage that returns the oil supplied to the rotary electric machine, from the second accommodating space to the oil storage, by allowing the oil to flow in a direction from the second accommodating space toward the first accommodating space; wherein a direction from the first accommodating space toward the second accommodating space is a target direction, and the target direction coincides with a direction toward a front of the vehicle in a state where the case is attached to the vehicle;

the third oil passage includes an opening/closing mechanism that opens and closes the third oil passage, and an opening that is open toward the oil storage;

the opening/closing mechanism includes an opening/closing member that is swingable about a swing axis extending in a horizontal direction orthogonal to the target direction, and that has a center of gravity below the swing axis;

the opening/closing member is configured to swing such that the center of gravity moves in the target direction to close the opening;

an inner wall surface defining the oil storage includes an inclined face that extends downward in the target direction;

the opening is formed in the inclined face;

the swing axis is disposed in an upper side of the inclined face; and the opening/closing member is supported in the case so as to be swingable about the swing axis.

2. The vehicle drive device according to claim 1, wherein the opening/closing member is configured to open the opening if target direction acceleration is less than or equal to a predetermined setting value, and close the opening if the target direction acceleration is greater than the setting value, the target direction acceleration being acceleration in the target direction applied to the opening/closing member.

3. The vehicle drive device according to claim 2, wherein a projection that projects in the target direction is formed in a closing of the opening/closing member that closes the opening.

4. The vehicle drive device according to claim 2, wherein the rotary electric machine is a first rotary electric machine, and a portion of the first accommodating space on a side of the target direction with respect to a portion of the first accommodating space accommodating the speed change device forms a space that accommodates a second rotary electric machine different from the first rotary electric machine;

a partition wall that separates the second accommodating space and the oil storage is disposed between the portion of the first accommodating space accommodating the second rotary electric machine and the portion of the second accommodating space accommodating the first rotary electric machine in the target direction; and the opening is formed in the partition wall.

5. The vehicle drive device according to claim 2, wherein an attachment for a breather is formed on a portion of the case forming the second accommodating space.

6. The vehicle drive device according to claim 2, wherein each of the first accommodating space and the second accommodating space includes a cylinder formed in a cylindrical shape and coaxial with the target direction; and the cylinder of the second accommodating space is formed to have a greater diameter than the cylinder of the first accommodating space.

7. The vehicle drive device according to claim 1, wherein a projection that projects in the target direction is formed in a closing of the opening/closing member that closes the opening.

8. The vehicle drive device according to claim 1, wherein the rotary electric machine is a first rotary electric machine, and a portion of the first accommodating space on a side of the target direction with respect to a portion of the first accommodating space accommodating the speed change device forms a space that accommodates a second rotary electric machine different from the first rotary electric machine;

a partition wall that separates the second accommodating space and the oil storage is disposed between the portion of the first accommodating space accommodating the second rotary electric machine and the portion of the second accommodating space accommodating the first rotary electric machine in the target direction; and the opening is formed in the partition wall.

9. The vehicle drive device according to claim 1, wherein an attachment for a breather is formed on a portion of the case forming the second accommodating space.

10. The vehicle drive device according to claim 1, wherein each of the first accommodating space and the second accommodating space includes a cylinder formed in a cylindrical shape and coaxial with the target direction; and the cylinder of the second accommodating space is formed to have a greater diameter than the cylinder of the first accommodating space.

* * * * *